United States Patent [19]

Langdon et al.

[11] Patent Number: 4,934,747
[45] Date of Patent: Jun. 19, 1990

[54] ELECTRIC METER SOCKET SEALING RING

[75] Inventors: Albert K. Langdon, Rochester Hills, Mich.; Peter Farbaniec, Colonia; Louis J. Mattos, Carteret, both of N.J.; Michael E. Lewis, Ann Arbor; Darrell A. Robinson, Highland, both of Mich.

[73] Assignee: Ekstron Industries, Inc., Farmington Hills, Mich.

[21] Appl. No.: 356,252

[22] Filed: May 24, 1989

[51] Int. Cl.5 .............................................. E05C 19/18
[52] U.S. Cl. ................................................ 292/256.67
[58] Field of Search .............. 292/256.67, 251, 256.65, 292/256.69, 205, 104, 320; 24/274 R

[56] References Cited

U.S. PATENT DOCUMENTS

| | | | |
|---|---|---|---|
| 2,643,150 | 6/1953 | Giles | 292/256.67 |
| 2,943,876 | 7/1960 | Morris | 24/274 R |
| 2,968,508 | 1/1961 | Campbell et al. | 292/256.67 |
| 3,172,282 | 3/1965 | Heckrotte | 70/178 |
| 3,259,414 | 7/1966 | Rothert | 292/256.67 |
| 3,265,426 | 8/1966 | Brooks et al. | 292/307 |
| 3,396,439 | 8/1968 | Schaub | 24/274 R |
| 4,134,609 | 1/1979 | Santori | 292/256.67 |
| 4,225,165 | 9/1980 | Kesselman | 292/256.67 |
| 4,329,860 | 5/1982 | Moberg | 70/164 |
| 4,422,679 | 12/1983 | Ruscitto | 292/307 |
| 4,531,770 | 7/1985 | Mattress, Jr. | 292/307 |

Primary Examiner—Richard E. Moore
Attorney, Agent, or Firm—Basile and Hanlon

[57] ABSTRACT

A sealing ring for an electric meter socket has first and second spaced ends. A tongue with a plurality of linearly spaced apertures extends linearly outward from the first end of the sealing ring. A housing is mounted on the second end of the sealing ring and includes a passage for receiving the tongue therethrough. A threaded fastener is mounted in the housing and engages successive apertures in the tongue to advance and retract the tongue through the housing to connect and disconnect the sealing ring about the electric meter socket. At least one and preferably two seal tabs extend outward from the second end of the band and engage the apertures in the tongue. A seal member is emplaceable through the seal tabs to indicate a sealed mounting on the sealing ring on the electric meter socket.

11 Claims, 3 Drawing Sheets

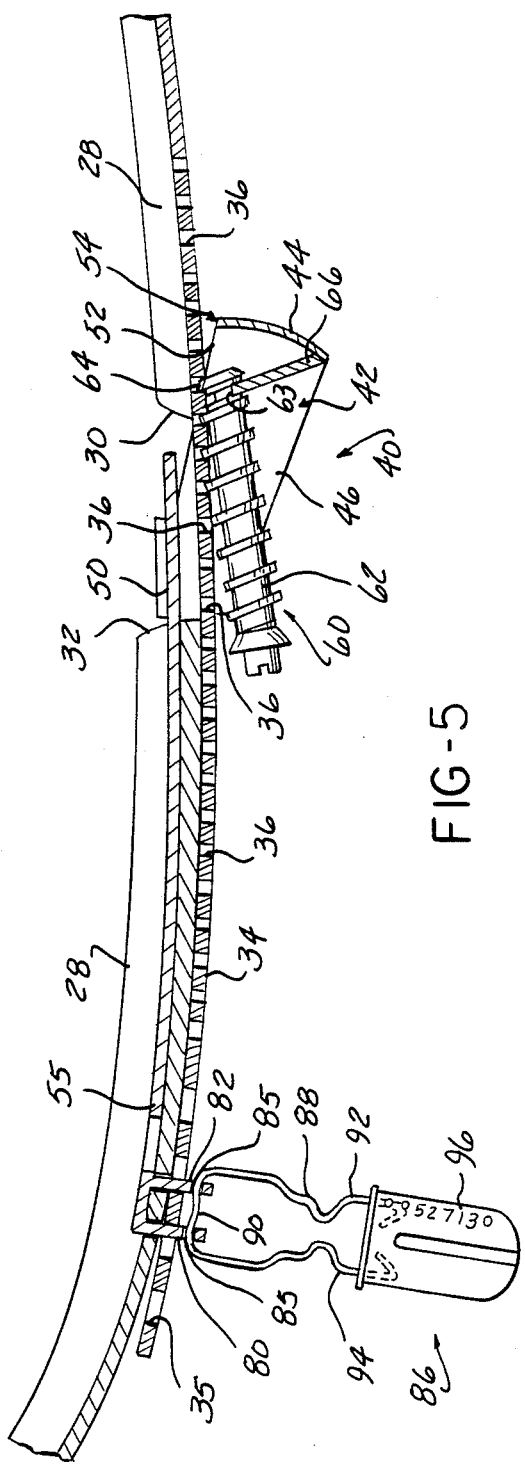
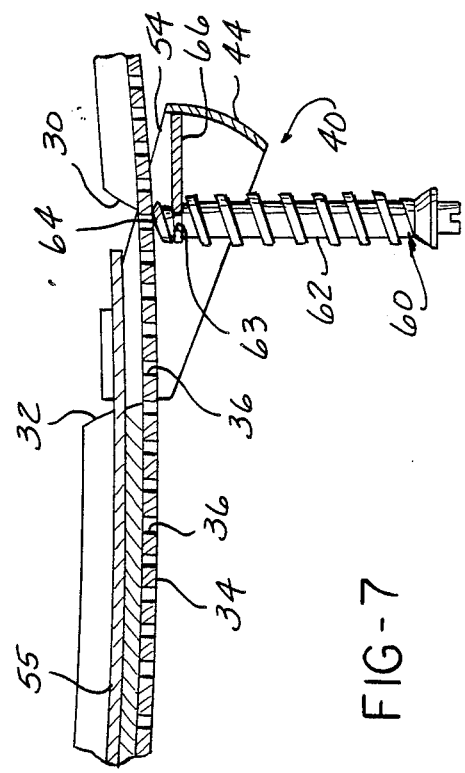

ELECTRIC METER SOCKET SEALING RING

BACKGROUND OF THE INVENTION

1. Field of the Invention

The present invention relates, in general, to electric meters and meter sockets and, more specifically, to sealing rings for electric meter sockets.

Electric meter sockets connect or disconnect an electric meter to a building electric service to measure electric power usage in a house or building. A common type of electric meter connection includes a meter housing containing the operative components of the meter which is removably attached to a meter socket by a clamping or sealing ring. Alternately, the sealing ring mounts a blank cover or a non-conductive cover simulating a meter to a socket in a disconnection situation. The ring has a U-shaped cross section and encloses the mounting ring or flange on the meter, blank cover or simulated cover and the mounting flange on the meter socket. The ends of the ring are secured together about the mounting flanges of the meter cover, etc., and meter socket to prevent removal of the meter, cover, etc., and/or unauthorized tampering with the meter.

A common type of electric meter socket sealing ring includes a slip lock in which an outwardly extending tab on one end of the ring slips within a slot formed on the other end of the ring. Another common type of sealing or clamping ring has a bolt passing through downturned tabs formed on the ends of the ring. With this type of sealing ring, two hands are required during installation or removal to separate the ends of the ring to enlarge the diameter of the ring sufficiently to slip over the mounting flanges of the socket and meter or cover.

Since meter tampering and electric current diversion is a major problem for utility companies, a variety of means have been developed to provide an indication of an attempted unauthorized access to the meter or to prevent any unauthorized access or tampering with the meter. Such means include passing a short wire loop through the joined ends of the clamping ring, with the ends of the loop being sealingly connected together by a lead bead. Other means include locking devices mounted on the clamp ring. Some of these locking devices require keys which hinder the free access by utility company personnel to the meter or which are easily lost or duplicated. Further, such locking devices are complicated and add to the expense of the meter installation.

In addition, most seal beads or other seal devices carry identifying members which correspond to the meter location and/or user. However, many of the previously designed sealing rings and/or locking devices do not include any provision that insures that the identifying numbers on one side or surface of the seal are facing outward from the socket for ready identification by a meter installer or reader. Further, many covers and simulated meters have no means for holding the cover or meter in the socket while the sealing ring is being installed; which complicates the meter installation and removal process.

Thus, it would be desirable to provide a sealing ring for an electric meter socket which securely mounts a meter, blank cover or simulated meter to a meter socket. It would also be desirable to provide an electric meter socket sealing ring which has a simple construction for a low manufacturing cost and long, reliable life. It would also be desirable to provide an electric meter socket sealing ring which can be easily used by authorized personnel in installing and removing an electric meter, blank cover, etc., on a socket. It would also be desirable to provide an electric meter socket sealing ring which provides an indication of unauthorized tampering with the meter. It would also be desirable to provide an electric meter socket sealing ring which will snugly fit different size electric meters and meter sockets. It would also be desirable to provide an electric meter socket sealing ring which can be temporarily increased in diameter for ease in installing a meter, blank cover or simulated meter which has no means to hold itself to the socket. Finally, it would be desirable to provide an electric meter socket sealing ring in which the diameter of the ring can be temporarily changed and locked in place without engaging the locking device on the sealing ring.

SUMMARY OF THE INVENTION

The present invention is an electric meter socket sealing ring which tightly connects an electric meter, blank cover or simulated meter to a meter socket. The sealing ring is in the form of an annular band having first and second spaced ends. The band has a generally U-shaped cross section so as to be mountable about the abutting mounting flanges of the electric meter and meter socket.

A tongue is formed at the first end of the band and includes a plurality of linearly spaced apertures. Threaded fastener means are mounted on the second end of the band and threadingly engage the linearly spaced apertures in the tongue at the first end of the band to advance or retract the first end of the band with respect to the second end to connect or disconnect the sealing ring about the mounting flanges of the meter and meter socket.

In a preferred embodiment, the threaded fastener means comprises a housing securely mounted on the second end of the band which includes a passage through which the tongue on the first end of the band retractibly extends. A threaded fastener or screw is mounted in the housing to threadingly engage the spaced apertures in the tongue to advance or retract the first end of the band toward or away from second end of the band. A plate is pivotally mounted in the housing and contains a centrally located aperture in which the threaded fastener is rotatably mounted.

At least one and preferably two spaced sealing tabs are formed in the band spaced from the second end of the band and extending outward from the exterior surface of the band. The sealing tabs fit within the apertures in the tongue of the band and receive a seal means through apertures in each tab to indicate a sealed mounting of the sealing ring on the mounting flanges of the electric meter and meter socket.

The electric meter sealing ring of the present invention has a simple, reliable construction for economical manufacturing cost, ease of use by utility company personnel in installing and removing a meter and a long, reliable life. The sealing ring of the present invention may be usable with a large number of different diameter meters.

Installation of removal of the sealing ring from the mounting flanges of the electric meter and meter socket is simplified due to the pivotal mounting of the threaded fastener in the housing on one end of the band of the sealing ring. The fastener may be moved or flipped between a tongue disengaged position and a tongue engaging position. This enables the installer to temporarily lock the sealing ring in any desired diameter when installing or removing the sealing ring from the meter and meter socket. This temporary locking feature is provided without the need for tightening the fastener and, in most instances, enables the installer to use only one hand when mounting the sealing ring about a meter and meter socket. This proves further advantages in meter installations in which the meter, blank cover or simulated meter lacks any means for holding itself in the meter socket.

The provision of at least two sealing tabs on the sealing ring also increases the anti-tampering features afforded by the sealing ring of the present invention. The two spaced sealing tabs make it more difficult to remove or tamper with the sealing ring. The sealing tabs are designed to receive any suitable sealing means, such as a plastic padlock. In addition, the sealing tabs cause the sealing means to be presented in an outwardly facing position such that any identifying indicia formed on the sealing means can be easily read by the installer.

BRIEF DESCRIPTION OF THE DRAWING

The various features, advantages and other uses of the present invention will become more apparent by referring to the following detailed description and drawing in which:

FIG. 5 is an enlarged, cross sectional view generally taken along line 5—5 in FIG. 1;

FIG. 7 is a partial cross sectional view similar to FIG. 5 but showing the fastener in its disengaged position with respect to the tongue.

DESCRIPTION OF THE PREFERRED EMBODIMENTS

Figure 1:
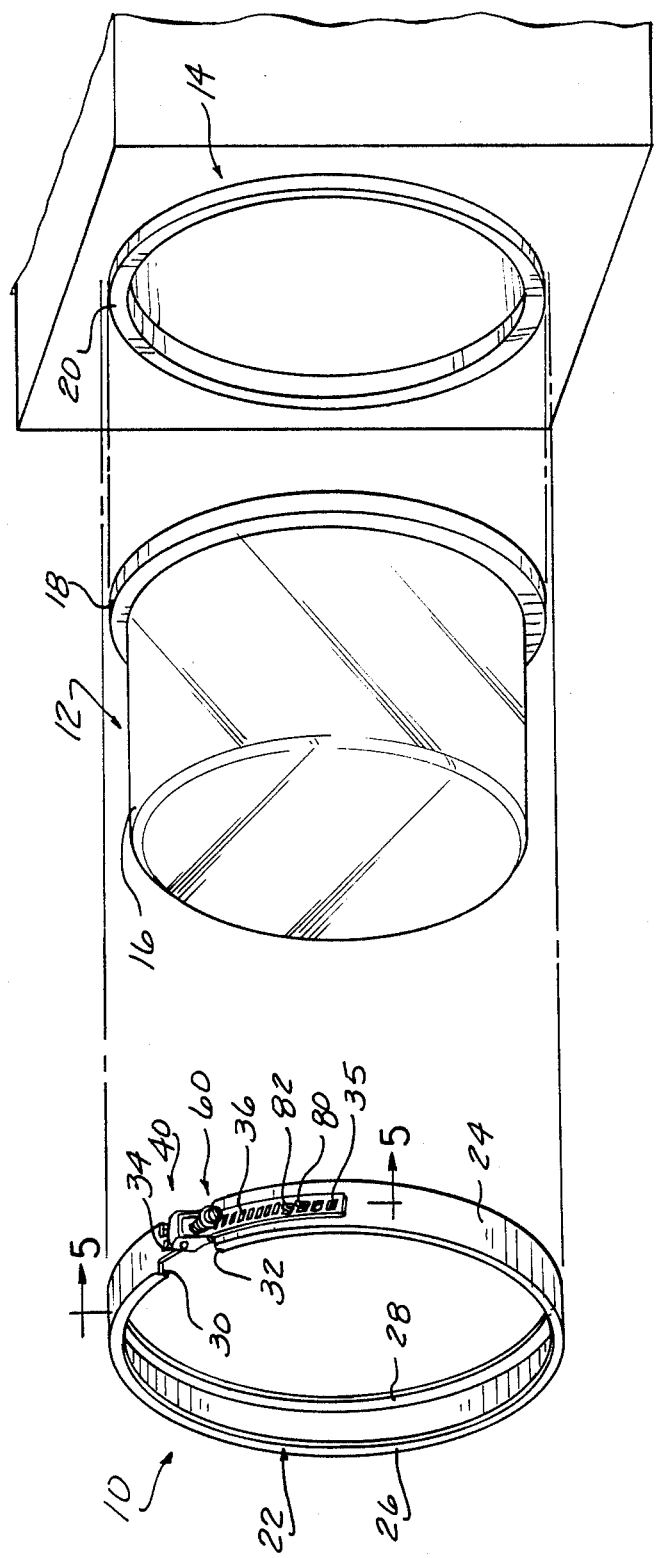
FIG. 1 is an exploded, perspective view of an electric meter socket sealing ring constructed in accordance with the teachings of the present invention illustrated with a conventional electric meter and meter socket.

Throughout the following description and drawing, an identical reference number is used to refer to the same component shown in multiple figures of the drawing.

Referring now to the drawing, and to FIG. 1 in particular, there is illustrated a sealing ring 10 which is used to releasably mount a conventional electric meter 12 or a blank cover or a simulated meter, not shown, on a meter socket 14.

The electric meter 12 is of conventional construction and is illustrated, by way of example only, as comprising a plug-in, socket-type meter. The meter 12 includes a glass or plastic housing 16 which surrounds and encompasses the operative elements of the meter. The glass or plastic housing 16 terminates in an annular mounting flange 18. The flange 18 of the meter 12 engages a correspondingly shaped annular flange 20 on the meter socket 14. As is conventional, the socket 14 is typically mounted on a building or house and is connected by electric conductors, not shown, to the internal building wiring. A similar mounting flange 18 is formed on a blank cover or simulated meter which mounts on the socket 14 in the same manner as described above.

Referring now to FIG. 1, and to FIGS. 2-7 in particular, the sealing ring 10, which is also known as a clamp ring or collar, is illustrated as being in the form of an annular shaped band. The band denoted by reference number 22 has a generally U-shaped cross section formed by a planar central portion 24 and two depending side flanges 26 and 28. The width of the central portion 24 and the length of the side flanges 26 and 28 are selected to snugly fit around the engaged mounting flanges 18 and 20 of the meter 12 and socket 14, respectively, when the sealing ring 10 is mounted about the mounting flanges 18 and 20.

The band 22 is formed of any suitable material, such as a metallic material, i.e., steel or aluminum, and has first and second spaced ends 30 and 32, respectively.

Figure 3:
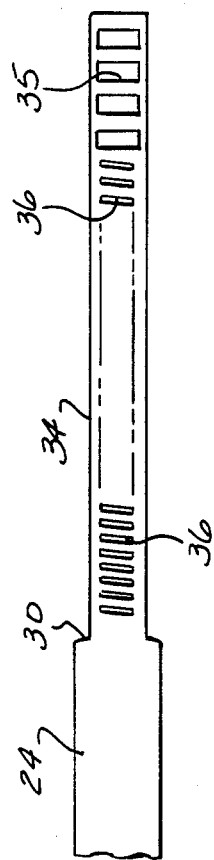
FIG. 3 is an enlarged, plan view of the first end of the sealing ring.
Figure 2:
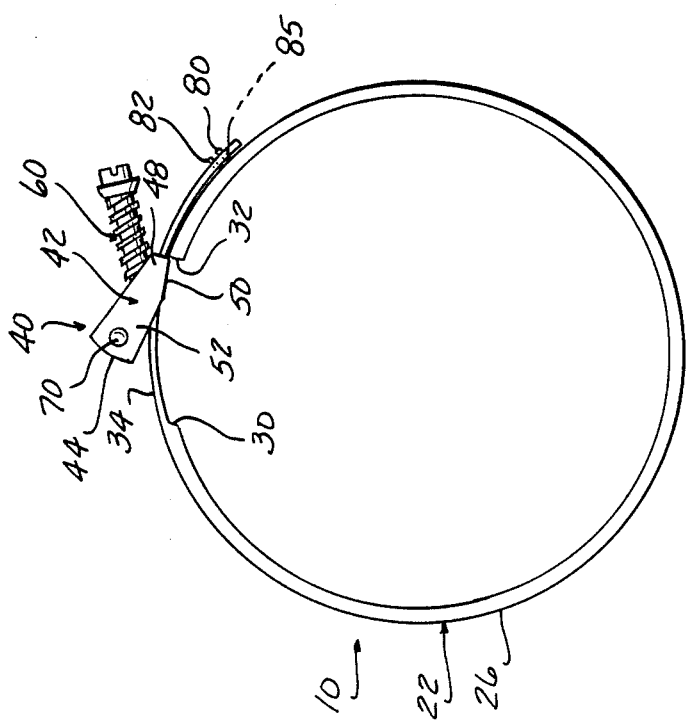
FIG. 2 is a front elevational view of the sealing ring of the present invention.

A tongue 34 is formed on the first end 30 of the band 22 and extends linearly outward as an extension of the first end 30 as shown in FIGS. 2 and 3. The tongue 34 has a slightly smaller width than the central portion 24 of the band 22 and may be formed as an integral extension of the band 22 or, alternately, as a separate member secured to the band 22 at the first end 30 by suitable fasteners, such as screws, rivets, etc.

The tongue 34 includes two sets of linearly aligned, spaced apertures 35 and 36. The apertures 35 extend for a predetermined distance along the length of the tongue 34, such as for one inch from the end of the tongue 34. The apertures 36 extend from the apertures 35 along the tongue 34. Preferably, the apertures 35 and 36 are in the form of elongated slots which have a length larger than their width. The apertures 35 are larger in size than the apertures 36. Further, the apertures 36 are preferably disposed at a small acute angle with respect to the lateral axis of the tongue 34 as clearly shown in FIG. 3.

The sealing ring 10 also includes threaded fastener means denoted in general by reference number 40 in FIGS. 1, 2, 4 and 5 which is mounted on the second end 32 of the band 22 and threadingly engages the apertures 36 in the tongue 34 to advance or retract the first end 30 of the band 22 toward or away from the second end 32 so as to change the diameter of the sealing ring 10. In a preferred embodiment, the threaded fastener means 40 is a fastener manufactured by Ideal Corp., and others, and comprises a generally three-sided hollow housing 42 which is fixedly secured to the second end 32 of the band 22. The housing 42 is formed with a central end portion 44 and two spaced side walls 46 and 48.

As shown in FIG. 2, each of the side walls 46 and 48 includes a base portion 50 and an angularly upstanding wall portion 52 which terminates in the central end or bight portion 44. The angular wall portion 52 creates a passage 54, FIGS. 5 and 7, below the bottom edge of the central end portion 44 and the second end 32 of the band 22 which extends through the housing 42 and receives the tongue 34 on the first end 30 of the band 22 therethrough, as described in greater detail hereafter.

Figure 4:
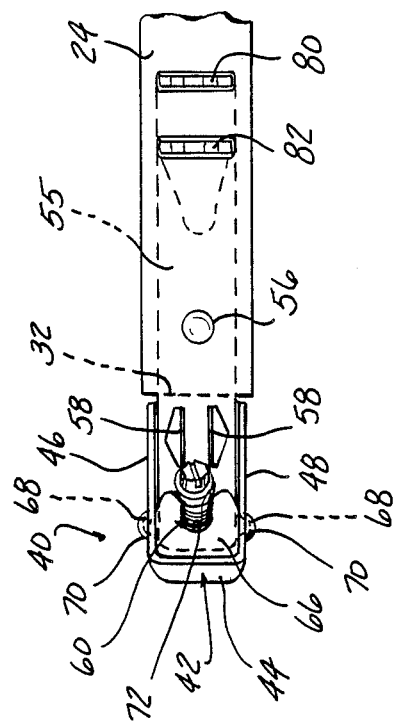
FIG. 4 is an enlarged plan view of the second end of the sealing ring.

The housing 42 may be mounted on the second end 32 of the band 22 by any conventional means, such as on the end of an integral extension of the band 22 or attached to a separate member mounted on the second end 32 of the band 22. In a preferred embodiment, as shown in FIGS. 4 and 5, a planar strip 55 is securely mounted by suitable fasteners, such as a rivet 56, to the interior surface of the band 22 and extends below and outward from the second end 32 of the band 22. The strip 55 includes a pair of slots 58 which receive an overturned edge portion of the base 50 of each of the side walls 46 and 48 of the housing 42 to securely mount the housing 42 to the strip 55.

The threaded fastener means 40 also includes a threaded fastener denoted in general by reference number 60 which is mounted in the housing 42 and threadingly engages the apertures 36 in the tongue 34 to advance and retract the tongue 34 and the first end 30 of the band 22 toward or away from the second end 32 of the band 22. As shown in FIG. 5, the threaded fastener 60 is generally in the form of a threaded screw having a plurality of external threads 62 extending along the length thereof. The fastener 60 has a reduced diameter or undercut section 63 adjacent a first end 64 which is rotatably trapped in a plate 66. The plate 66 is pivotally mounted within the housing 42 between the side walls 46 and 48 and the central end portion 44. A pair of outwardly extending tabs 68, FIG. 4, on the plate 66 are pivotally received in recesses 70 formed in the side walls 46 and 48 of the housing 42. A centrally located aperture 72 is formed in the plate 66 and rotatably receives the reduced diameter portion 63 of the fastener 60.

In use, the meter 12 is abutted with the socket 14 such that the mounting flanges 18 and 20 are brought into engagement. With the fastener 60 in a raised position, as shown in FIG. 7, the tongue 34 is slid through the passage 54 in the housing 42 attached to the second end 32 of the sealing ring 10 until the diameter of the ring 10 approximates the diameter of the mounting flanges 18 and 20. The fastener 60 may be flipped down to the position shown in FIG. 5 to temporarily lock the sealing ring 10 in a fixed diameter. The sealing ring 10 is then disposed over the abutted mounting flanges 18 and 20 of the meter 12 and socket 14. With the fastener 60 in a raised position, the ends 30 and 32 of the band 22 are then squeezed together to engage the band 22 with the flanges 18 and 20 before the fastener 60 is again flipped down to a lower position shown in FIG. 5 in which the end 64 of the fastener 60 engages one of the apertures 36 in the tongue 34. This temporarily locks the band 22 at a fixed diameter in engagement with the mounting flanges 18 and 20. The fastener 60 is then rotated clockwise causing the first end 64 of the fastener 60 to engage successive spaced apertures 36 in the tongue 34 to advance the tongue 34 and the first end 30 of the sealing ring 10 toward the second end 32 such that the tongue 34 overlays the exterior surface of the second end 32 of the sealing ring 22 as shown in FIG. 5. The fastener 60 is rotated until the desired amount of tightness is obtained to securely attach the meter 12 to the meter socket 14.

To remove the meter 12 from the socket box 14, the fastener 60 may be rotated in an opposite, counterclockwise direction to urge the tongue 34 away from the second end 32 of the sealing ring 10 sufficiently to increase the diameter of the sealing ring 10. The sealing ring 10 may be more quickly removed by merely flipping the fastener 60 to the raised position shown in FIG. 7 or until the first end 64 of the fastener 60 disengages from the apertures 36 in the tongue 34 of the band 22 to enable the ends 30 and 32 of the band 22 to spring apart sufficiently to remove the sealing ring 10 from the mounting flanges 18 and 20. The fastener 60 may be flipped down at any time to lock the sealing ring 10 in a fixed diameter.

The sealing ring 10 of the present invention also includes at least one and preferably two spaced seal tabs denoted by reference numbers 80 and 82 in FIGS. 1, 2, 4, 5 and 6 which are useful in providing an indication of unauthorized access to the meter 12 when used with a proper seal. The seal tabs 80 and 82 are each in the form of a planar member which extends outward from the exterior surface of the sealing ring 22 and is spaced a short distance from the second end 32 of the band 22. The tabs 80 and 82 may be formed as an integral part of the sealing ring 22 by punching each tab 80 and 82 from the central portion 24 of the band 22. In a preferred embodiment, however, the tabs 80 and 82 are formed on the strip-like member 54 which is attached to and mounts the housing 42 on the second end 32 of the band 22. The tabs 80 and 82 may be formed in any suitable manner, such as by punching the tab from the strip 54, as with the tab 82 shown in FIG. 4, and by bending the end of the strip 54 substantially perpendicular to the remainder of the strip 54 to form the tab 80.

Figure 6:
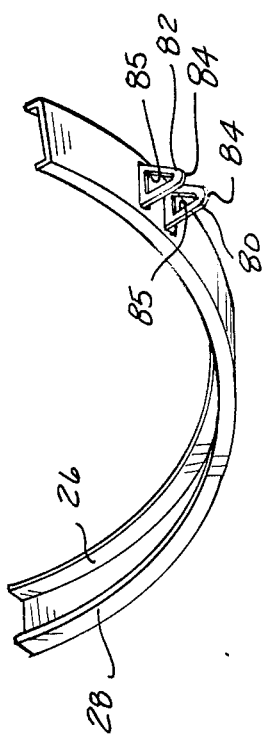
FIG. 6 is a partial, enlarged perspective view of the sealing tabs mounted on the sealing ring.

Each of the tabs 80 and 82, as shown in detail in FIG. 6, has a generally triangular shape extending from an enlarged base contiguous with the strip 54 to a apex 84. Each tab 80 and 82 also includes an internal, triangularly shaped aperture 85.

The tabs 80 and 82 are each slidably insertable through one of the enlarged apertures 35 in the tongue 34 of the band 22 after the tongue 34 is passed through the housing 42 and the band 22 has been tightened about the mounting flanges 18 and 20 of the meter 12 and socket 14 as shown in FIGS. 1, 2 and 5. In this position, the apertures 85 in each tab 80 and 82 are disposed above the exterior surface of the tongue 34 surrounding each tab 80 and 82 to receive a seal means 86.

The seal means 86 may comprise any type of seal commonly employed with electric meters to indicate that the meter has been removed or unauthorized access to the meter has been attempted. Thus, a conventional seal ring in the form of a thin wire may be passed through the aligned apertures 85 in the tabs 80 and 82 and joined together at its ends by a conventional lead seal bead. However, in a preferred embodiment, a plastic padlock, such as one manufactured by E. J. Brooks Co., is employed. Such a plastic padlock 86 includes a thin wire 88 preformed to include a relatively flat central portion 90 and two legs 92 and 94. The ends of the legs 92 and 94 are bent inwardly toward the opposite leg as shown in FIG. 5 and are slidably insertable into spaced recesses formed in a plastic housing 96 after the wire 88 has been passed through the apertures 85 in the tabs 80 and 82. The ends of the legs 92 and 94 engage the interior of the plastic housing 96 such that any attempted removal or separation of the wire 88 from the housing 96 causes the ends of the legs 92 and 94 to engage and deform the housing 96 and thereby provide a visible indication of attempted tampering with and/or removal of the sealing ring 10.

Although the seal means 86 may be effectively employed with only one tab 80 or 82, additional anti-tampering indication capabilities are achieved by employing two spaced tabs 80 and 82 on the sealing ring 10. With the central portion 90 of the wire 88 disposed through the apertures 85 in the tabs 80 and 82, as shown in FIG. 5, the seal means 86 or plastic padlock is situated in a position such that one surface of the housing 96 of the seal means 86 continually faces outward from the socket 14 and is readily visible by an installer or meter reader to verify identifying indicia typically placed on the housing 96 to identify a particular user of the meter 12.

Further, the use of the seal means 86 with two tabs 80 and 82 also prevents any attempted distortion of the shape of the wire 88 which would enable the tongue 34 to be raised away from the band 22 to allow separation of the ends 30 and 32 of the band 22 sufficient to remove the band 22 from the mounting flanges 18 and 20.

In summary, there has been disclosed a unique electric meter socket sealing ring which is adapted to securely mount an electric meter to a meter socket. The sealing ring is of simple construction for ease in installing and removing an electric meter from a meter socket, has an economical manufacturing cost and a long, reliable, useful life. The sealing ring also provides an indication of any attempted access to the meter when employed with a proper seal.

What is claimed is:

1. A sealing ring for an electric meter and a meter socket having mating annular mounting flanges comprising:
    an annular band having first and second spaced ends and a U-shaped cross section mountable about the abutted mounting flanges of the electric meter and meter socket;
    a tongue formed on the first end of the band;
    a plurality of linearly spaced apertures formed in the tongue;
    threaded fastener means mounted on the second end of the band and threadingly engageable with the apertures in the tongue for advancing the first end of the band towards and away from the second end of the band;
    a sealing tab mounted adjacent the second end of the band and extending outward from the band, the sealing tab being engageable with one of the apertures in the tongue after the tongue has passed over the exterior of the second end of the band;
    an aperture formed in the sealing tab; and
    sealing means, mountable through the aperture in the sealing tab after the sealing tab has been passed through an aperture in the tongue, for indicating a sealed mounting of the sealing ring on the mounting flanges of the electric mounting and meter socket.

2. The sealing ring of claim 1 wherein the apertures in the tongue are in the form of slots.

3. The sealing ring of claim 2 wherein certain of the slots are disposed at an acute angle with respect to the lateral axis of the band.

4. A sealing ring for an electric meter and a meter socket having mating annular mounting flanges comprising:
    an annular bend having first and second spaced ends and a U-shaped cross section mountable about the abutted mounting flanges of the electric meter and meter socket;
    a tongue formed on the first end of the band;
    a plurality of linearly spaced apertures formed in the tongue;
    threaded fastener means mounted on the second end of the band and threadingly engageable with the apertures in the tongue for a advancing the first end of the band towards and away from the second end of the band;
    first and second spaced sealing tabs mounted adjacent the second end of the band and extending outward from the band, the first and second sealing tabs being engageable with apertures in the tongue after the tongue has passed over the exterior of the second end of the band;
    an aperture formed in each of the first and second sealing tabs; and
    seal means, mountable through the apertures in the first and second sealing tabs after the sealing tabs have been passed through apertures in the tongue, for indicating a sealed mounting of the sealing ring on the mounting flanges of the electric meter and meter socket.

5. The sealing ring of claim 4 wherein:
    the apertures in the first and second sealing tabs are triangularly shaped.

6. The sealing ring of claim 4 wherein:
    the first and second sealing tabs have a generally triangular shape extending from an enlarged base contiguous with the band to an apex.

7. A sealing ring for an electric meter and a meter socket having mating annular mounting flanges comprising:
    an annular band having first and second spaced ends and a U-shaped cross section mountable about the abutted mounting flanges of the electric meter and meter socket;
    a tongue formed on the first end of the band;
    a plurality of linearly spaced apertures formed in the tongue;
    a housing mounted on the second end of the band and including a passage extending therethrough for receiving the tongue of the band therethrough;
    a threaded fastener rotatably mounted in the housing and successively threadingly engaging the apertures in the tongue of the band to advance and retract the tongue of the band through the passage in the housing;
    first and second spaced sealing tabs mounted adjacent the second end of the band and extending outward from the band, the first and second sealing tabs being engageable with the apertures in the tongue after the tongue has passed through the housing on the band;
    an aperture formed in each of the first and second sealing tabs; and
    seal means, mountable through the apertures in the first and second sealing tabs after the tongue has been disposed about the first and second sealing tabs, for indicating a sealed mounting of the sealing ring on the mounting flanges of the electric meter and meter socket.

8. The sealing ring of claim 3 wherein:
    the certain ones of the slots disposed at an acute angle are engaged by the threaded fastener means; and
    the other slots are engaged by the sealing tab.

9. The sealing ring of claim 4 wherein the apertures and the tongue are in the form of slots.

10. The sealing ring of claim 9 wherein certain of the slots are disposed at an acute angle with respect to the lateral axis of the band.

11. The sealing ring of claim 10 wherein:
    the certain ones of the slots disposed at an acute angle are engaged by the threaded fastener means; and
    the other slots are engaged by the first and second sealing tabs.

* * * * *